United States Patent [19]

Sato

[11] Patent Number: 5,187,600
[45] Date of Patent: Feb. 16, 1993

[54] APPARATUS FOR SCANNING AN OPTICAL RECORDING MEDIUM WITH A BEAM OF LIGHT

[75] Inventor: Toshiharu Sato, Kawagoe, Japan

[73] Assignee: Citizen Watch Co., Ltd., Tokyo, Japan

[21] Appl. No.: 503,930

[22] Filed: Apr. 4, 1990

[30] Foreign Application Priority Data

Apr. 7, 1989 [JP] Japan .................... 1-88915

[51] Int. Cl.$^5$ ............................. G02F 1/13
[52] U.S. Cl. ........................ 359/41; 359/15; 359/17; 369/112; 369/103; 235/454; 235/457
[58] Field of Search ............... 369/44.12, 44.24, 44.32, 369/44.37, 44.38, 103, 112; 359/40, 43, 54, 15, 17, 19, 41; 235/454, 457

[56] References Cited

U.S. PATENT DOCUMENTS

| | | | |
|---|---|---|---|
| 4,772,101 | 9/1988 | Liu | 359/54 |
| 4,815,035 | 3/1989 | Brooks | 359/54 |
| 4,899,224 | 2/1990 | Ooba et al. | 359/54 |
| 4,999,619 | 3/1991 | Te Velde | 359/54 |
| 5,020,881 | 5/1991 | Matsuda et al. | 359/54 |
| 5,046,061 | 9/1991 | Chaya et al. | 369/112 |
| 5,059,000 | 10/1991 | Koneko et al. | 359/43 |
| 5,063,551 | 11/1991 | Yoshio et al. | 358/342 |
| 5,078,474 | 1/1992 | Marui et al. | 359/40 |

Primary Examiner—Aristotelis Psitos
Assistant Examiner—Paul W. Huber
Attorney, Agent, or Firm—Finnegan, Henderson, Farabow, Garrett & Dunner

[57] ABSTRACT

An optical beam scanning apparatus including a semiconductor laser, a first lens which converts a divergent beam to a parallel beam, a liquid crystal display for two-dimensionally modulating the intensity of the parallel beam and having a matrix of vertical and horizontal electrodes which constitute modulating elements at the crossings of the electrodes, a second lens which converges the parallel beam incident thereon to a focal point of the second lens system, a spatial optical modulator located at the focal point of the second lens system to convert the converged beam to a parallel wave, and a third lens which produces a beam spot from the parallel wave incident thereon at a focal point of the third lens.

13 Claims, 4 Drawing Sheets

APPARATUS FOR SCANNING AN OPTICAL RECORDING MEDIUM WITH A BEAM OF LIGHT

BACKGROUND OF THE INVENTION

1. Field of the Invention

The present invention relates to an optical beam scanning apparatus for scanning a recording medium with a beam of light in an optical recording and reproducing apparatus, such as an optical disk apparatus using a hologram.

2. Description of the Related Art

In a conventional optical beam scanning apparatus, a recording medium such as a rotational optical disk is scanned with a beam which is converged onto a predetermined position of the optical disk, for example, by rotation of the optical disk or radial linear movement of an optical pick-up. In this apparatus, however, a problem of deviation of a scanning beam arises because of surface fluctuations (oscillation) due to the rotation of the optical disk or a possible eccentricity of the center of the rotation. Nevertheless, this problem can be solved by the servo-drive of the optical pick-up.

Such a servo-drive, however, and the necessary precise control of the rotational and linear movements of the optical disk and the optical pick-up, make the apparatus more complicated and more expensive. Furthermore, the conventional scanning apparatus has a low scanning speed, and less resistance to noise and oscillation, and further, there is only a small freedom of posture of use of the apparatus.

The primary object of the present invention is to provide an optical beam scanning apparatus by which a beam of light can be converged onto a desired position of an optical recording medium, such as an optical disk, without moving an optical pick-up or the optical recording medium.

SUMMARY OF THE INVENTION

To achieve the above object, according to the present invention, there is provided an optical beam scanning apparatus comprising a semiconductor laser, a first lens system which converts a divergent beam to a parallel beam, a two-dimensional optical modulator composed of a liquid crystal display for a two-dimensional modulation of the intensity of the parallel beam and having a matrix of vertical and horizontal electrodes which constitute modulating elements at the crossing of the electrodes, a second lens system which converges the parallel beam incident thereon to a focal point of the second lens system, a spatial optical modulator located at the focal point of the second lens system, to convert the converged beam to a parallel wave, and a third lens system which produces a beam spot from the parallel wave incident thereon at a focal point of the third lens system.

According to another aspect of the present invention, there is provided an optical card memory device comprising a semiconductor laser, a first lens system which converts a divergent beam to a parallel beam, a two-dimensional optical modulator composed of a liquid crystal display for a two-dimensional modulation of the intensity of the parallel beam and having a matrix of vertical and horizontal electrodes which constitute modulating elements at the crossing of the electrodes, a second lens system which converges the parallel beam incident thereon to a focal point of the second lens system, a spatial optical modulator located at the focal point of the second lens system to convert the converged beam to a parallel wave, a third lens system which produces a beam spot from the parallel wave incident thereon at a focal point of the third lens system, an optical card having a reflective recording area, a beam splitter located between the two-dimensional optical modulator and the second lens system, to split signal light reflected from the optical card into predetermined directions, and an optical detector located in an extension of the predetermined direction of the signal light, to receive and detect the signal light.

BRIEF DESCRIPTION OF THE DRAWINGS

The invention will be described below in detail with reference to the accompanying drawings, in which.

DESCRIPTION OF THE PREFERRED EMBODIMENTS

Figure 1:
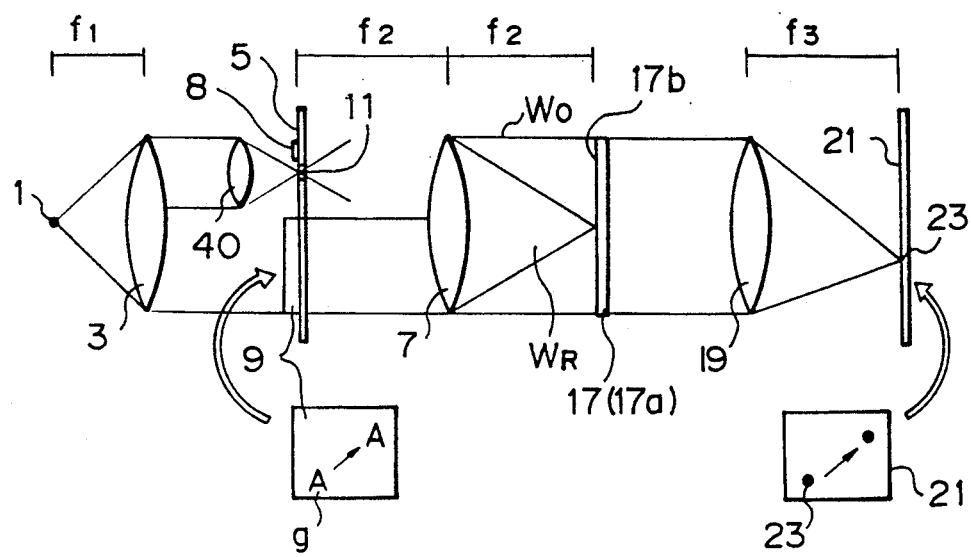
FIG. 1 is a schematic view of an optical scanning apparatus according to an embodiment of the present invention.

In an arrangement shown in FIG. 1, which shows a first embodiment of the present invention, a point light source 1, a collimate lens (first lens) 3, a light intercepting plate 5, a Fourier transform lens (second lens) 7, a hologram substrate 17a, a condenser lens (third lens) 19, and a screen 21 are located in this order. Laser beams of light emitted from a point light source 1 located at the focal length $f_1$ of the collimate lens 3 are converted to parallel rays by the collimate lens 3, and are made incident upon the light intercepting plate 5 located at an object focal surface (focal length $f_2$) of the Fourier transform lens 7. The light intercepting plate 5 is provided with a pinhole 11 and a liquid crystal display 9, and the light intercepting plate 5 (i.e., the pin-hole 11 and the liquid crystal display 9) is located at the focal length $f_2$ of the Fourier transformer lens 7.

The liquid crystal display 9 has an image g (represented by a letter "A" in the illustrated embodiment) preformed thereon. The forming of the image on the liquid crystal display 9 will be described in detail hereinafter. Light emitted from the light source 1 can pass through the light intercepting plate 5 only at the pin-hole 11 and the liquid crystal display 9, which forms a two-dimensional optical modulator. Note, numeral 40 designates a condenser lens which converges beams onto the pin-hole 11. As a result, a plane wave $W_o$ (e.g., an object wave) from the pin-hole 11 and a spherical wave $W_R$ (e.g., a reference wave) having an amplitude distribution proportional to a Fourier transform G of an amplitude transmittance distribution of the image g, reach the focal plane (image plane) of the lens 7 at which the hologram substrate 17a is located. The hologram substrate 17a is made of a transparent body (e.g., glass plate having a photosensitive layer 17b applied to one face thereof adjacent to the lens 7. Consequently, a hologram (interference fringes) 17 is formed on the hologram substrate 17a (photosensitive layer 17b) by a holographic interference of two waves, i.e., the object wave $W_o$ and the reference wave $W_R$.

Upon reconstruction of the hologram 17, the pin-hole 11 is closed, for example, by a proper mask 8 or a shutter (not shown), for example, by a manual operation. The image g is preformed on the liquid crystal display 9, as in the construction of the hologram mentioned above. Consequently, upon reconstructing the hologram 17, when the light source (e.g., semiconductor laser) 1 is made ON, only the reference wave $W_R$ is incident upon the hologram 17, and thus the hologram 17 is reconstructed. Namely, a point image 23 is formed on the screen 21 located at the focal length $f_3$ of the condenser lens 19, the point image 23 moves on the screen 21 in accordance with the movement of the image g formed on the liquid crystal display 9, and accordingly, the beam scanning can be performed by the movement of the image g on the liquid crystal display 9.

Figure 2:
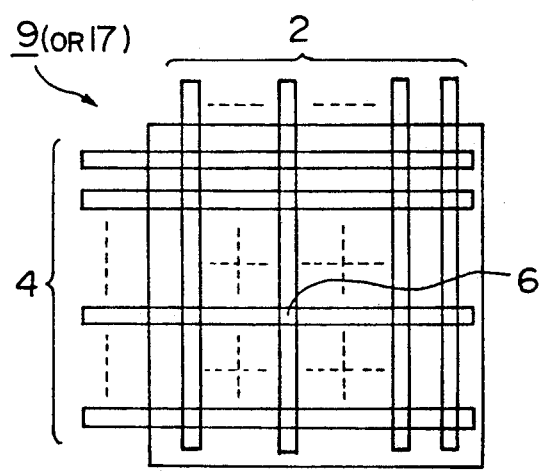
FIG. 2 is a schematic view of an electrode pattern of a liquid crystal display shown in FIG. 1.

The liquid crystal display 9 has a matrix arrangement of vertical electrodes 2 and horizontal electrodes 4, as shown in FIG. 2, and as is well known. A cross portion of one vertical electrode 2 and one horizontal electrode 4 constitutes one modulation element 6.

Since the formation and the movement of the image g are electrically controlled by a method known perse, no mechanical operation is needed to scan a recording medium, which corresponds to the screen 21 in FIG. 1, with scanning beams.

A conventional twisted nematic type LCD can be used as the liquid crystal display 9, and preferably has a response speed of several tens of milliseconds, more preferably, is a ferroelectric type having a higher response speed and allowing one scanning within a few microseconds.

The hologram 17 can be effectively used as a spatial optical modulator in the present invention and can be constructed by a holographic interference of the reference and object waves using the optical system shown in FIG. 1, mentioned above. As can be seen from the foregoing, the pin-hole 11 is used only when the hologram 17 is constructed. Namely, when reconstructing the hologram 17, the pin-hole 11 is not provided.

Alternatively, in place of the hologram, it is possible to form an optical modulator by a liquid crystal display controlled by a matrix arrangement of vertical and horizontal electrodes, similar to the liquid crystal display 9 shown in FIG. 2. In this alternative, interference fringes obtained by computer calculation are displayed on the liquid crystal display, to effect the modulation. This ensures a precise modulation free from noise or possible setting errors, in comparison with the actual formation of the hologram, and makes it possible to easily adjust the modulation function to restrict the low frequency band thereby and thus form a clearer spot image 23.

To brighten the spot image 23 focused on the screen 21, it is possible to effect only the modulation of phase in the spatial optical modulator, to thereby increase the diffraction efficiency of the hologram. To this end, it is possible to use a photoresist for the photosensitive layer 17b of the hologram substrate 17a. In a liquid crystal display element which constitutes the spatial optical modulator, it is possible to indicate only the phase component of the interference fringes, to thereby effect only the modulation of the phase.

Alternatively, it is possible to use a volume hologram to increase the diffraction efficiency of the hologram. To this end, it is possible to provide a thick photosensitive layer 17b having a thickness about 10 microns. The diffraction efficiency is about 6% for a normal amplitude modulation, more than 30% for the phase modulation, and more than 50% for the phase modulation using the volume hologram, respectively.

Figure 3A:
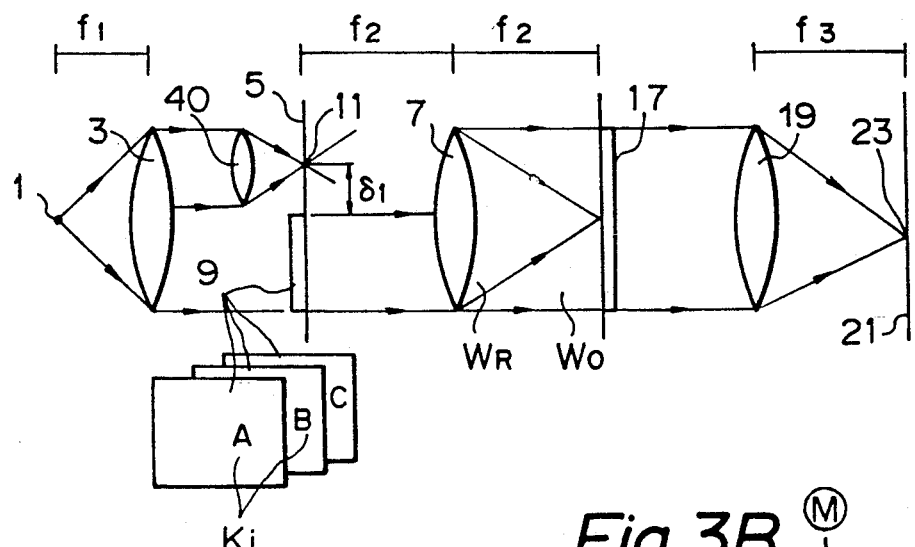
FIG. 3A is a schematic view of an optical scanning apparatus according to another embodiment of the present invention.

FIG. 3A shows another embodiment of the present invention, in which the basic optical arrangement is substantially the same as that of FIG. 1. In FIG. 3, when different holograms 17 are constructed by the holographic interference of two beams (reference wave $W_R$ and object wave $W_o$), different kinds of images Ki (i=1, 2, 3 ... n) are formed on the liquid crystal display 9, and the pin-hole 11 is moved every time the hologram 17 is constructed. Namely, the distance $\hat{l}_i$ (i=1,2,3, ... n) of the axis of the pin-hole 11 from the axes of the lens 3 and 7 (i.e., the optical axis of the optical system shown in FIG. 3) is changed upon each formation of the holograms 17. The holograms 17 (multiple hologram) are formed by a multiple interference exposure known perse.

Figure 3B:
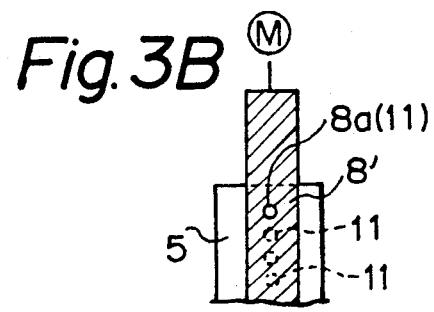
FIG. 3B is a front elevational view of a mask used in an arrangement shown in FIG. 3A.

The change of the distance $\hat{l}_i$ of the pin-hole 11 can be realized, for example, by using a mask 8' as shown in FIG. 3B, in which the light intercepting plate 5 is provided with a row of a predetermined number of pin-holes 11, and the mask 8' has an aperture 8a corresponding to the pin holes 11. The mask 8, can be moved, for example, by a drive such as a linear motor M, in the vertical direction. The vertical movement of the mask 8' causes the aperture 8a to be successively registered with one of the pin-holes 11, so that the distance $\hat{l}_i$ of the pin-hole 11 can be successively changed.

Upon reconstruction of the multiple hologram 17, the pin-hole 11 is closed, for example, by the mask 8 (FIG. 1), and the image Ki is formed on the liquid crystal display 9. When the reference wave $W_R$ is made incident on the hologram 17, a spot image (point image) 23 corresponding to the position $\hat{l}_i$ of the pin-hole 11 is formed on the screen 21. Namely, different spot images are formed on the screen 21 by changing the kinds of images Ki formed on the liquid crystal display 9, so that the screen 12 (recording medium) is scanned with the scanning beams.

Alternatively, it is possible to directly move the pinhole 11 itself to change the distance $\hat{l}_i$. In this alternative, the pin-hole 11 must be formed separately from the liquid crystal display 9, as otherwise the movement of the pin-hole 11 will cause the liquid crystal display to move.

As can be understood from the foregoing, to produce the scanning beams the position of the image is moved in the first embodiment shown in FIG. 1, whereas the kind of image is changed in the second embodiment.

It is possible to combine both embodiments. Namely, in such a combination, the position and the kinds of images are changed to produce the scanning beams.

Figure 4:
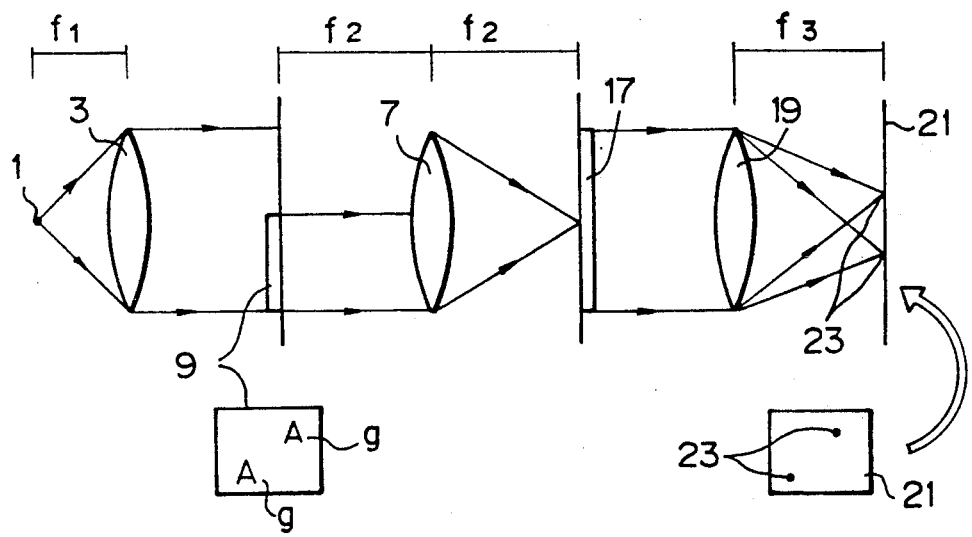
FIG. 4 is a schematic view of an optical scanning apparatus according to still another embodiment of the present invention.

FIG. 4 shows a third embodiment of the present invention in which the basic optical arrangement and the principle of the scanning are substantially the same as that of FIG. 1, and accordingly, the components corresponding to those in FIG. 1 are designated with the same reference numerals. Note that FIG. 4 shows only a reconstruction optical system of the hologram 17

(i.e., the components necessary for constructing the hologram 17, such as the pin-hole 11 and object wave $W_o$, lens 5, are not shown in FIG. 4). In FIG. 4, the liquid crystal display 9 has two or more than two images g preformed thereon upon construction and reconstruction of the hologram 17. In this embodiment, two or more than two spot images 23 are formed on the screen 21 (recording medium) to be scanned with more than one scanning beam at one time. Such a plurality of scanning beams can be advantageously used, for example, in a POS (Point Of Sales), to precisely read bar codes recorded on goods.

Figure 5:
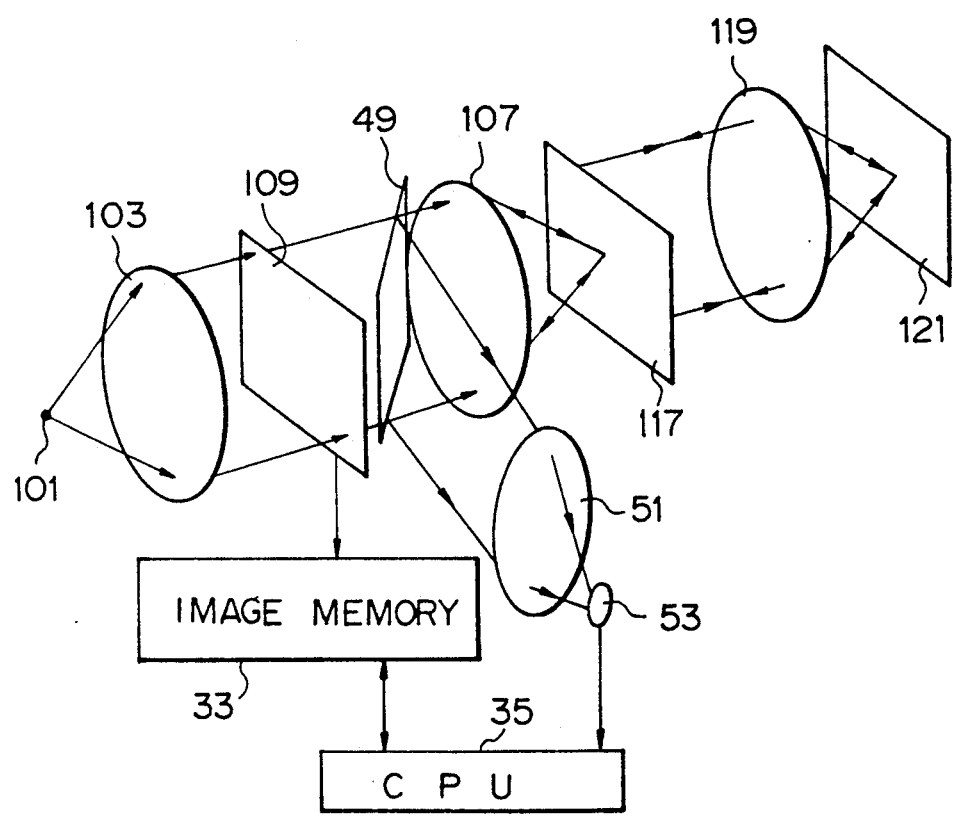
FIG. 5 is a schematic view of a card memory to which the present invention is applied; and, FIGS. 6A and 6B are diagrams showing two examples of an image, according to the present invention.

FIG. 5 shows another embodiment of the present invention, when applied to an optical card memory device.

In FIG. 5, the components corresponding to those in FIG. 1 or FIG. 3 are designated with numerals which are identical to the corresponding numerals, plus one hundred. For example, the semiconductor laser (light source), which is designated with numeral 1 in FIG. 1 or FIG. 3, is designated 101 in FIG. 5. In FIG. 5, the images displayed in the liquid crystal display 109 are stored in an image memory 33. The position and the kind of images are automatically selected by a CPU 35, so that a desired image is instantaneously displayed in the liquid crystal display 109 in accordance with the position of the scanning beams.

The multiple interference fringes are formed on the hologram 117 in accordance with the images made by the liquid crystal display 109 and the pin-hole 11 (FIG. 1 or FIG. 3). The optical card 121 has a reflective recording area in which a change in the intensity of light reflected thereby occurs in accordance with an intensity of incident light when light having an intensity higher than a predetermined level is made incident thereon.

In this optical system, a laser beam emitted from the semiconductor laser 101 is converted to a parallel beam by the collimate lens 103, to be incident upon the liquid crystal display 109, so that a Fourier transform image of the image formed on the liquid crystal display 109 is formed on the hologram 117 through the Fourier transform lens 107. As a result, the beam is converged onto the optical card 121 through the condenser lens 119. Signal light (an intensity of which is modulated) reflected by the optical card 121 is partly returned to the semiconductor laser 101 along the same light path as that on entering the optical card 121 and is partly split by a beam splitter 49 in a predetermined direction deviated from the optical axis of the lenses 103, 107, and 119. The beam splitter 49, which is, for example, in the form of a half mirror, is located in the optical path of the optical system at an inclination angle of 45° with respect thereto, between the liquid crystal display 109 and the second lens 107. The signal light is then made incident upon an optical detector, such as a photodiode 53, through a condenser lens (fourth lens) 51 to read the signal beam reflected by the optical card 121. The photodetector 53 is located at the focal length of the fourth lens 51 to receive the signal light.

Upon writing information to the optical card 121, the output of the laser beam is increased to be higher than a predetermined level.

In an example, assuming that a ferroelectric liquid crystal display 109 having a matrix of 360×360 (dots) of modulations elements defined by the vertical and horizontal electrodes in a square of 54 mm×54 mm is used, and that one image is formed in an area of 12×12 (dots), the movement of one image enables the optical card 121 to be scanned with the scanning beams at about $1.2 \times 10^5$ positions, at an operation speed of a few microseconds for one scanning.

If 35 kinds of images having a lesser correlation are used, an optical card 121 having a capacitance of $1.2 \times 10^5 \times 35 = 4.2 \times 10^6$, i.e., about 0.5 MB, can be scanned. In this case, the image memory which stores the images should have a capacitance of about 40 KB.

Figure 6A:
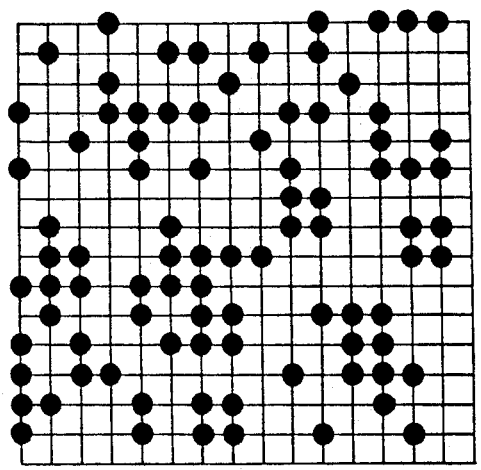
Figure 6B:
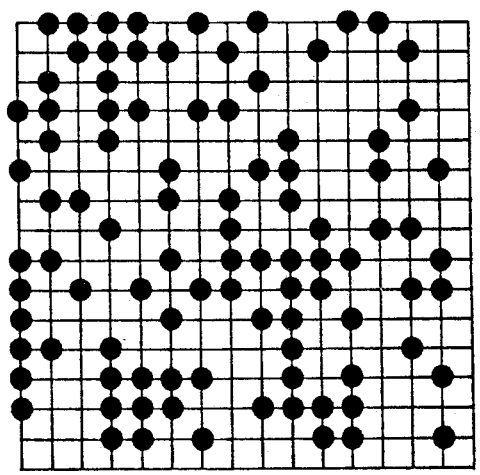

FIGS. 6A and 6B show two different examples of dot patterns of images g defined by the crossings of the vertical and horizontal electrodes of the liquid crystal display. The images shown in FIGS. 6A and 6B have a lesser correlation.

Preferably, as mentioned before, the volume phase hologram (optical mask) 50 mm×50 mm×5 mm (thickness) has a high diffraction efficiency, and all of the lenses have a diameter of 50 mm and a focal length of 50 mm. The optical card 121 is 85.7 mm×54 mm, the recording area of which is 37.5 mm×24 mm. The recording is effected by piercing holes having a bit diameter of 10 tm at a bit pitch of 15 tm. The optical system comprising the components as mentioned above can be accommodated in a small parallelepiped container 300 mm × 100 mm × 70 mm.

It is possible to directly move the liquid crystal display itself, instead of the image or images formed thereon, if necessary.

As mentioned above, according to the present invention, since the beam scanning can be effected without moving the optical recording medium and the optical pick-up, neither a precise rotational and linear movement mechanism nor a complex servo-drive are necessary, thus resulting in a small and light-weight beam scanning apparatus with less noise and a high oscillation resistance. Furthermore, there is no restriction on the posture of usage of the apparatus. In the apparatus according to the present invention, a parallel scanning becomes possible due to the parallel characteristics of the light.

I claim:

1. An optical beam scanning apparatus comprising a semiconductor laser emitting a divergent beam of light, a first lens system for receiving the divergent beam of light and converting it to a parallel beam of light having a given intensity, a two-dimensional optical modulator for receiving the parallel beam comprising a liquid crystal display for two-dimensional modulation of the intensity of the parallel beam and having a matrix of vertical and horizontal electrodes that cross each other with constitute modulating elements at the crossings of the electrodes, a second lens system for receiving the parallel beam from the modulator and converging it to a focal point of the second lens system, a spatial optical modulator located at the focal point of the second lens system for converting the converged beam to a parallel wave, and a third lens system for recieving the parallel wave and producing a beam spot from the parallel wave incident thereon at a focal point of the third lens system.

2. The optical beam scanning apparatus of claim 1, wherein said spatial optical modulator is a hologram.

3. The optical beam scanning apparatus of claim 1, wherein said spatial optical modulator comprises a liquid crystal display having a matrix of vertical and horizontal electrodes which constitute modulating elements at the crossing of the electrodes.

4. The optical beam scanning apparatus of claim 2, wherein said liquid crystal display of the two-dimensional optical modulator has an image which is controlled by the electrodes in a matrix arrangement, and wherein said hologram has holographically recorded interference fringes corresponding to the image formed on the liquid crystal display.

5. The optical beam scanning apparatus of claim 4, further comprising control means for controlling the image to be formed on the liquid crystal display of the two-dimensional optical modulator.

6. The optical beam scanning apparatus of claim 5, further comprising memory means for storing an image to be formed on the liquid crystal display of the two-dimensional optical modulator.

7. The optical beam scanning apparatus of claim 5, wherein said control means controls a location of the image formed on the liquid crystal display of the two-dimensional optical modulator.

8. The optical beam scanning apparatus of claim 2, wherein said liquid crystal display of the two-dimensional optical modulator has a plurality of images which are controlled by the electrodes in a matrix arrangement, and wherein said hologram has holographically recorded interference fringes corresponding to the images formed on the liquid crystal display.

9. The optical beam scanning apparatus of claim 2, wherein said liquid crystal display of the two-dimensional optical modulator has a plurality of images displayed at one time, which plurality of images are controlled by the electrodes in a matrix arrangement, and wherein said hologram has holographically recorded interference fringes corresponding to the images formed on the liquid crystal display.

10. The optical beam scanning apparatus of claim 9, further comprising control means for controlling the images to be formed oh the liquid crystal display of the two-dimensional optical modulator.

11. The optical beam scanning apparatus of claim 10, wherein said control means controls a position of the images formed on the liquid crystal display of the two-dimensional optical modulator.

12. An optical card memory device comprising a semiconductor laser emitting a divergent beam of light, a first lens system for receiving the divergent beam of light and converting it to a parallel beam of light having a given intensity, a two-dimensional optical modulator for receiving the parallel beam comprising a liquid crystal display for two-dimensionally modulating the intensity of the parallel beam and having a matrix of vertical and horizontal electrodes that cross each other which constitute modulating elements at the crossings of the electrodes, a second lens system for receiving the parallel beam from the modulator and converging it to a focal point of the second lens system, a spatial optical modulator located at the focal point of the second lens system for converting the converged beam to a parallel wave, and a third lens system for receiving the parallel wave and producing a beam spot from the parallel wave incident thereon at a focal point of the third lens system, an optical card having a reflective recording area for receiving the beam spot, a beam splitter located between the two-dimensional optical modulator and the second lens system to redirect a portion of a signal light reflected from the optical card into a predetermined direction, and an optical detector located in an extension of the predetermined direction of the reflected signal light to receive and detect its presence.

13. The optical card memory device of claim 12, further comprising a fourth lens system located between the optical detector and the beam splitter, the optical detector being located at the focal length of the fourth lens system.

* * * * *